United States Patent
Hutcheson (10) Patent No.: US 10,245,508 B2
(45) Date of Patent: *Apr. 2, 2019

(54) METHOD AND SYSTEM FOR PROVIDING INTERACTIVE SERVICES OVER A WIRELESS COMMUNICATIONS NETWORK

(71) Applicant: INTEL CORPORATION, Santa Clara, CA (US)

(72) Inventor: S. Douglas Hutcheson, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 14/467,875

(22) Filed: Aug. 25, 2014

(65) Prior Publication Data
US 2015/0141142 A1   May 21, 2015

Related U.S. Application Data (63) Continuation of application No. 11/635,804, filed on Dec. 7, 2006, now Pat. No. 8,819,740, which is a
(Continued)

(51) Int. Cl.
*H04N 21/414* (2011.01)
*A63F 13/332* (2014.01)
(Continued)

(52) U.S. Cl.
CPC ............ *A63F 13/332* (2014.09); *A63F 13/10* (2013.01); *A63F 13/12* (2013.01); *A63F 13/35* (2014.09);
(Continued)

(58) Field of Classification Search
CPC ................................................ H04N 21/41407
See application file for complete search history.

(56) References Cited

U.S. PATENT DOCUMENTS

| 4,825,879 A | 5/1989 | Tan et al. |
| 4,850,007 A | 7/1989 | Marino et al. |

(Continued)

FOREIGN PATENT DOCUMENTS

| EP | 1043675 A2 | 10/2000 |
| EP | 1066867 | 1/2001 |

(Continued)

OTHER PUBLICATIONS

PTO-1449 considered by examiner in U.S. Appl. No. 14/828,199, dated Feb. 8, 2016.

(Continued)

*Primary Examiner* — Joshua D Taylor
(74) *Attorney, Agent, or Firm* — Womble Bond Dickinson (US) LLP (57) ABSTRACT

A system for providing one or more interactive applications to one or more users via a wireless communications network, the system including: one or more servers cooperating with the network to substantially deliver one or more interactive applications to one or more wireless access devices each corresponding to at least one of the users; wherein, after the one or more wireless access devices receive the substantially delivered one or more applications, upon request of one of the users the one or more corresponding wireless access devices receives communication from the server to facilitate the one of the users accessing the one or more interactive applications using the corresponding wireless access device.

22 Claims, 8 Drawing Sheets

Related U.S. Application Data continuation of application No. 09/989,985, filed on Nov. 21, 2001, now abandoned.

(60) Provisional application No. 60/252,468, filed on Nov. 22, 2000.

(51) Int. Cl.

| | | |
|---|---|---|
| *A63F 13/77* | (2014.01) | |
| *A63F 13/40* | (2014.01) | |
| *A63F 13/30* | (2014.01) | |
| *A63F 13/35* | (2014.01) | |
| *H04W 56/00* | (2009.01) | |
| A63F 13/92 | (2014.01) | |

(52) U.S. Cl.
CPC ....... *A63F 13/77* (2014.09); *H04N 21/41407* (2013.01); *H04W 56/0015* (2013.01); *A63F 13/92* (2014.09); *A63F 2300/204* (2013.01); *A63F 2300/406* (2013.01); *A63F 2300/407* (2013.01); *A63F 2300/50* (2013.01); *A63F 2300/558* (2013.01); *A63F 2300/5566* (2013.01); *A63F 2300/572* (2013.01)

(56) References Cited

U.S. PATENT DOCUMENTS

| | | |
|---|---|---|
| 4,865,038 A | 9/1989 | Rich et al. |
| 4,918,601 A | 4/1990 | Vermesse |
| 4,960,128 A | 10/1990 | Gordon et al. |
| 4,964,408 A | 10/1990 | Hink et al. |
| 5,041,187 A | 8/1991 | Hink et al. |
| 5,069,213 A | 12/1991 | Polczynski |
| 5,163,438 A | 11/1992 | Gordon et al. |
| 5,170,786 A | 12/1992 | Thomas et al. |
| 5,249,576 A | 10/1993 | Goldberger et al. |
| 5,337,744 A | 8/1994 | Branigan |
| 5,396,225 A | 3/1995 | Okada et al. |
| 5,431,170 A | 7/1995 | Mathews |
| 5,452,717 A | 9/1995 | Branigan et al. |
| 5,482,036 A | 1/1996 | Diab et al. |
| 5,490,505 A | 2/1996 | Diab et al. |
| 5,494,043 A | 2/1996 | O'Sullivan et al. |
| 5,533,511 A | 7/1996 | Kaspari et al. |
| 5,579,535 A | 11/1996 | Orlen et al. |
| 5,586,937 A | 12/1996 | Menashe |
| 5,590,649 A | 1/1997 | Caro et al. |
| 5,618,045 A | 4/1997 | Kagan et al. |
| 5,632,272 A | 5/1997 | Diab et al. |
| 5,638,816 A | 6/1997 | Kiani-Azarbayjany et al. |
| 5,638,818 A | 6/1997 | Diab et al. |
| 5,645,440 A | 7/1997 | Tobler et al. |
| 5,678,544 A | 10/1997 | Delonzor et al. |
| 5,685,299 A | 11/1997 | Diab et al. |
| 5,694,549 A | 12/1997 | Carlin et al. |
| 5,729,016 A | 3/1998 | Klapper et al. |
| D393,830 S | 4/1998 | Tobler et al. |
| 5,738,538 A | 4/1998 | Bruch et al. |
| 5,738,583 A * | 4/1998 | Comas .................. A63F 13/12 463/40 |
| 5,743,262 A | 4/1998 | Lepper et al. |
| 5,758,644 A | 6/1998 | Diab et al. |
| 5,760,910 A | 6/1998 | Lepper et al. |
| 5,769,785 A | 6/1998 | Diab et al. |
| 5,782,757 A | 7/1998 | Diab et al. |
| 5,785,659 A | 7/1998 | Caro et al. |
| 5,791,347 A | 8/1998 | Flaherty et al. |
| 5,809,415 A | 9/1998 | Rossmann |
| 5,810,734 A | 9/1998 | Caro et al. |
| 5,820,463 A | 10/1998 | O'Callaghan et al. |
| 5,823,950 A | 10/1998 | Diab et al. |
| 5,830,131 A | 11/1998 | Caro et al. |
| 5,833,618 A | 11/1998 | Caro et al. |
| 5,838,909 A * | 11/1998 | Roy .................. H04L 29/06 463/42 |
| 5,848,396 A | 12/1998 | Gerace |
| 5,852,775 A | 12/1998 | Hidary |
| 5,855,015 A | 12/1998 | Shoham |
| 5,860,919 A | 1/1999 | Kiani-Azarbayjany et al. |
| 5,862,220 A | 1/1999 | Perlman |
| 5,890,929 A | 4/1999 | Mills et al. |
| 5,890,963 A | 4/1999 | Yen |
| 5,899,855 A | 5/1999 | Brown |
| 5,900,905 A | 5/1999 | Shoff et al. |
| 5,904,654 A | 5/1999 | Wohltmann et al. |
| 5,905,865 A | 5/1999 | Palmer et al. |
| 5,918,603 A | 7/1999 | Brown |
| 5,919,134 A | 7/1999 | Diab |
| 5,934,925 A | 8/1999 | Tobler et al. |
| 5,937,037 A | 8/1999 | Kamel et al. |
| 5,940,182 A | 8/1999 | Lepper et al. |
| 5,942,969 A | 8/1999 | Wicks |
| 5,959,596 A | 9/1999 | McCarten et al. |
| 5,970,143 A | 10/1999 | Schneier et al. |
| 5,991,735 A | 11/1999 | Gerace |
| 5,995,855 A | 11/1999 | Kiani et al. |
| 5,997,343 A | 12/1999 | Mills et al. |
| 6,002,952 A | 12/1999 | Diab et al. |
| 6,007,426 A | 12/1999 | Kelly et al. |
| 6,009,150 A | 12/1999 | Kamel |
| 6,011,986 A | 1/2000 | Diab et al. |
| 6,014,576 A | 1/2000 | Raley |
| 6,024,643 A | 2/2000 | Begis |
| 6,027,452 A | 2/2000 | Flaherty et al. |
| 6,036,642 A | 3/2000 | Diab et al. |
| 6,038,599 A | 3/2000 | Black et al. |
| 6,042,477 A | 3/2000 | Addink |
| 6,045,509 A | 4/2000 | Caro et al. |
| 6,047,327 A | 4/2000 | Tso et al. |
| 6,049,821 A | 4/2000 | Theriault et al. |
| 6,050,898 A | 4/2000 | Vange et al. |
| 6,055,510 A | 4/2000 | Henrick et al. |
| 6,067,462 A | 5/2000 | Diab et al. |
| 6,078,789 A | 6/2000 | Bodenmann et al. |
| 6,081,735 A | 6/2000 | Diab et al. |
| 6,088,607 A | 7/2000 | Diab et al. |
| 6,101,381 A | 8/2000 | Tajima et al. |
| 6,104,837 A | 8/2000 | Walker |
| 6,110,522 A | 8/2000 | Lepper et al. |
| 6,113,494 A | 9/2000 | Lennert |
| 6,113,495 A | 9/2000 | Walker et al. |
| 6,128,599 A | 10/2000 | Walker et al. |
| 6,128,660 A | 10/2000 | Grimm et al. |
| 6,131,087 A | 10/2000 | Luke et al. |
| 6,132,315 A | 10/2000 | Miyamoto et al. |
| 6,134,532 A | 10/2000 | Lazarus et al. |
| 6,134,590 A | 10/2000 | Perlman |
| 6,143,532 A | 10/2000 | Lazarus et al. |
| 6,151,516 A | 11/2000 | Kiani-Azarbayjany et al. |
| 6,152,754 A | 11/2000 | Gerhardt et al. |
| 6,154,745 A | 11/2000 | Kari et al. |
| 6,157,841 A | 12/2000 | Bolduc et al. |
| 6,157,850 A | 12/2000 | Diab et al. |
| 6,165,005 A | 12/2000 | Mills et al. |
| 6,181,927 B1 | 1/2001 | Welling, Jr. et al. |
| 6,184,521 B1 | 2/2001 | Coffin et al. |
| 6,199,067 B1 | 3/2001 | Geller |
| 6,205,205 B1 | 3/2001 | Goldberg et al. |
| 6,206,830 B1 | 3/2001 | Diab et al. |
| 6,208,866 B1 | 3/2001 | Rouhollahzadeh et al. |
| 6,216,129 B1 | 4/2001 | Eldering |
| 6,223,291 B1 | 4/2001 | Puhl et al. |
| 6,229,856 B1 | 5/2001 | Diab et al. |
| 6,236,872 B1 | 5/2001 | Diab et al. |
| 6,238,291 B1 | 5/2001 | Fujimoto et al. |
| 6,256,523 B1 | 7/2001 | Diab et al. |
| 6,263,222 B1 | 7/2001 | Diab et al. |
| 6,278,522 B1 | 8/2001 | Lepper et al. |
| 6,280,213 B1 | 8/2001 | Tobler et al. |
| 6,285,681 B1 | 9/2001 | Kolze et al. |
| 6,285,868 B1 | 9/2001 | Ladue |
| 6,285,896 B1 | 9/2001 | Tobler et al. |

(56) References Cited

U.S. PATENT DOCUMENTS

| | | |
|---|---|---|
| 6,287,200 B1 | 9/2001 | Sharma |
| 6,310,505 B1 | 10/2001 | Ogawa et al. |
| 6,314,301 B1 | 11/2001 | Dorenbosch et al. |
| 6,314,572 B1 | 11/2001 | LaRocca et al. |
| 6,315,668 B1 | 11/2001 | Metke et al. |
| 6,320,495 B1 | 11/2001 | Sporgis |
| 6,330,603 B1 * | 12/2001 | Seki .................. H04L 12/5695 |
| | | 709/223 |
| 6,334,065 B1 | 12/2001 | Al-Ali et al. |
| 6,343,313 B1 | 1/2002 | Salesky et al. |
| 6,349,228 B1 | 2/2002 | Kiani et al. |
| 6,352,479 B1 | 3/2002 | Sparks, II |
| 6,353,839 B1 | 3/2002 | King et al. |
| 6,360,114 B1 | 3/2002 | Diab et al. |
| 6,361,440 B1 | 3/2002 | Ogawa et al. |
| 6,371,854 B1 | 4/2002 | Ikeda et al. |
| 6,371,921 B1 | 4/2002 | Caro et al. |
| 6,377,793 B1 | 4/2002 | Jenkins |
| 6,377,829 B1 | 4/2002 | Al-Ali |
| 6,383,075 B1 | 5/2002 | Jeong et al. |
| 6,388,240 B2 | 5/2002 | Schulz et al. |
| 6,397,091 B2 | 5/2002 | Diab et al. |
| 6,416,414 B1 | 7/2002 | Stadelmann |
| 6,430,525 B1 | 8/2002 | Weber et al. |
| 6,434,378 B1 | 8/2002 | Fougnies |
| 6,453,029 B1 | 9/2002 | Campbell |
| 6,453,160 B1 * | 9/2002 | Thomas ................ G07F 17/32 |
| | | 455/3.06 |
| 6,463,078 B1 | 10/2002 | Engstrom et al. |
| 6,463,311 B1 | 10/2002 | Diab |
| 6,470,199 B1 | 10/2002 | Kopotic et al. |
| 6,477,573 B1 | 11/2002 | Lea |
| 6,480,885 B1 | 11/2002 | Olivier |
| 6,501,975 B2 | 12/2002 | Diab et al. |
| 6,511,378 B1 | 1/2003 | Bhatt et al. |
| 6,515,273 B2 | 2/2003 | Al-Ali |
| 6,518,045 B1 | 2/2003 | Imamura et al. |
| 6,524,189 B1 | 2/2003 | Rautila |
| 6,525,386 B1 | 2/2003 | Mills et al. |
| 6,526,300 B1 | 2/2003 | Kiani et al. |
| 6,527,641 B1 | 3/2003 | Sinclair et al. |
| 6,541,756 B2 | 4/2003 | Schulz et al. |
| 6,542,764 B1 | 4/2003 | Al-Ali et al. |
| 6,553,236 B1 | 4/2003 | Dunko et al. |
| 6,554,707 B1 | 4/2003 | Sinclair et al. |
| 6,580,086 B1 | 6/2003 | Schulz et al. |
| 6,584,336 B1 | 6/2003 | Ali et al. |
| 6,587,441 B1 | 7/2003 | Urban et al. |
| 6,597,933 B2 | 7/2003 | Kiani et al. |
| 6,601,091 B1 | 7/2003 | Spilo |
| 6,606,511 B1 | 8/2003 | Ali et al. |
| 6,628,302 B2 | 9/2003 | White et al. |
| 6,631,440 B2 | 10/2003 | Jenne et al. |
| 6,632,181 B2 | 10/2003 | Flaherty et al. |
| 6,640,116 B2 | 10/2003 | Diab |
| 6,643,530 B2 | 11/2003 | Diab et al. |
| 6,647,257 B2 | 11/2003 | Owensby |
| 6,650,917 B2 | 11/2003 | Diab et al. |
| 6,654,624 B2 | 11/2003 | Diab et al. |
| 6,658,276 B2 | 12/2003 | Kianl et al. |
| 6,671,531 B2 | 12/2003 | Al-Ali et al. |
| 6,677,858 B1 | 1/2004 | Faris et al. |
| 6,678,543 B2 | 1/2004 | Diab et al. |
| 6,680,922 B1 | 1/2004 | Jorgensen |
| 6,684,062 B1 | 1/2004 | Gosior et al. |
| 6,684,090 B2 | 1/2004 | Ali et al. |
| 6,697,656 B1 | 2/2004 | Al-Ali |
| 6,697,658 B2 | 2/2004 | Al-Ali |
| RE38,476 E | 3/2004 | Diab et al. |
| 6,699,125 B2 | 3/2004 | Kirmse et al. |
| 6,699,194 B1 | 3/2004 | Diab et al. |
| 6,702,672 B1 | 3/2004 | Angell et al. |
| 6,712,702 B2 | 3/2004 | Goldberg et al. |
| 6,714,804 B2 | 3/2004 | Al-Ali et al. |
| RE38,492 E | 4/2004 | Diab et al. |
| 6,716,103 B1 * | 4/2004 | Eck ...................... A63F 13/23 |
| | | 463/40 |
| 6,719,631 B1 | 4/2004 | Tulley et al. |
| 6,725,075 B2 | 4/2004 | Al-Ali |
| 6,726,567 B1 | 4/2004 | Khosla |
| 6,745,060 B2 | 6/2004 | Diab et al. |
| 6,760,607 B2 | 7/2004 | Al-All |
| 6,765,925 B1 | 7/2004 | Sawyer et al. |
| 6,770,028 B1 | 8/2004 | Ali et al. |
| 6,771,994 B2 | 8/2004 | Kiani et al. |
| 6,772,245 B1 | 8/2004 | Pomerantz et al. |
| 6,779,119 B1 | 8/2004 | Moshfeghi et al. |
| 6,785,561 B1 | 8/2004 | Kim |
| 6,792,300 B1 | 9/2004 | Diab et al. |
| 6,813,511 B2 | 11/2004 | Diab et al. |
| 6,816,741 B2 | 11/2004 | Diab |
| 6,822,564 B2 | 11/2004 | Al-Ali |
| 6,826,419 B2 | 11/2004 | Diab et al. |
| 6,830,711 B2 | 12/2004 | Mills et al. |
| 6,850,787 B2 | 2/2005 | Weber et al. |
| 6,850,788 B2 | 2/2005 | Al-Ali |
| 6,852,083 B2 | 2/2005 | Caro et al. |
| 6,861,639 B2 | 3/2005 | Al-Ali |
| 6,874,029 B2 | 3/2005 | Hutcheson et al. |
| 6,877,096 B1 | 4/2005 | Chung et al. |
| 6,893,347 B1 | 5/2005 | Zilliacus et al. |
| 6,898,452 B2 | 5/2005 | Al-Ali et al. |
| 6,920,345 B2 | 7/2005 | Al-Ali et al. |
| 6,931,268 B1 | 8/2005 | Kiani-Azarbayjany et al. |
| 6,934,570 B2 | 8/2005 | Kiani et al. |
| 6,939,305 B2 | 9/2005 | Flaherty et al. |
| 6,943,348 B1 | 9/2005 | Coffin, IV |
| 6,947,761 B2 | 9/2005 | Hutcheson et al. |
| 6,950,687 B2 | 9/2005 | Al-Ali |
| 6,961,598 B2 | 11/2005 | Diab |
| 6,985,494 B2 | 1/2006 | Thompson |
| 6,993,325 B1 | 1/2006 | Waesterlid |
| 7,035,653 B2 | 4/2006 | Simon et al. |
| 7,076,556 B1 | 7/2006 | Brock et al. |
| 7,284,202 B1 | 10/2007 | Zenith |
| 7,376,728 B1 | 5/2008 | Motoyama et al. |
| 7,574,493 B2 | 8/2009 | Hutcheson et al. |
| 7,627,680 B2 | 12/2009 | Hutcheson et al. |
| 7,787,894 B2 | 8/2010 | Simon et al. |
| 8,024,434 B2 | 9/2011 | Hutcheson et al. |
| 8,238,950 B2 | 8/2012 | Simon et al. |
| 8,380,829 B2 | 2/2013 | Hutcheson et al. |
| 8,606,308 B2 | 12/2013 | Simon et al. |
| 8,769,122 B2 | 7/2014 | Hutcheson et al. |
| 8,819,740 B2 | 8/2014 | Hutcheson |
| 9,112,893 B2 | 8/2015 | Hutcheson et al. |
| 9,805,544 B2 | 10/2017 | Hutcheson et al. |
| 9,814,978 B2 | 11/2017 | Hutcheson et al. |
| 2001/0005839 A1 | 6/2001 | Maenpaa et al. |
| 2001/0011248 A1 | 8/2001 | Himmel et al. |
| 2001/0013037 A1 | 8/2001 | Matsumoto |
| 2001/0014911 A1 | 8/2001 | Doi et al. |
| 2002/0030163 A1 | 3/2002 | Zhang |
| 2002/0052239 A1 | 5/2002 | Finn |
| 2002/0061743 A1 | 5/2002 | Hutcheson et al. |
| 2002/0068592 A1 | 6/2002 | Hutcheson et al. |
| 2002/0083461 A1 | 6/2002 | Hutcheson et al. |
| 2002/0122302 A1 | 9/2002 | Palmer |
| 2002/0142759 A1 | 10/2002 | Newell et al. |
| 2004/0002384 A1 | 1/2004 | Multerer et al. |
| 2004/0029638 A1 | 2/2004 | Hytcheson et al. |
| 2005/0169235 A1 | 8/2005 | Hutcheson et al. |
| 2006/0004874 A1 | 1/2006 | Hutcheson et al. |
| 2007/0112706 A1 | 5/2007 | Herbrich et al. |
| 2007/0180477 A1 | 8/2007 | Hutcheson |
| 2010/0153498 A1 | 6/2010 | Hutcheson et al. |
| 2010/0173695 A1 | 7/2010 | Hutcheson et al. |
| 2012/0072485 A1 | 3/2012 | Hutcheson et al. |
| 2012/0142423 A1 | 6/2012 | Varadarajan et al. |
| 2014/0038707 A1 | 2/2014 | Hutcheson et al. |
| 2014/0229528 A1 | 8/2014 | Hutcheson et al. |
| 2014/0378231 A1 | 12/2014 | Hutcheson et al. |
| 2015/0141142 A1 | 5/2015 | Hutcheson |
| 2015/0241941 A1 | 8/2015 | Luna et al. |

(56) References Cited

U.S. PATENT DOCUMENTS

| | | |
|---|---|---|
| 2015/0352440 A1 | 12/2015 | Hutcheson et al. |
| 2015/0356819 A1 | 12/2015 | Hutcheson et al. |
| 2015/0356820 A1 | 12/2015 | Hutcheson et al. |

FOREIGN PATENT DOCUMENTS

| | | |
|---|---|---|
| EP | 1066868 | 1/2001 |
| EP | 1086732 | 3/2001 |
| EP | 1087323 | 3/2001 |
| FR | 2685865 A1 | 7/1993 |
| WO | 92/21280 A1 | 12/1992 |
| WO | 94/27494 A1 | 12/1994 |
| WO | 98/17369 A2 | 4/1998 |
| WO | WO 98/17359 A | 4/1998 |
| WO | WO 00/35216 A1 | 6/2000 |
| WO | 00/59374 A1 | 10/2000 |
| WO | 01/13790 A1 | 3/2001 |
| WO | WO 01/31476 A1 | 5/2001 |
| WO | 02/43368 A2 | 5/2002 |
| WO | 02/43404 A2 | 5/2002 |
| WO | 02/76077 A1 | 9/2002 |
| WO | 02/84898 A1 | 10/2002 |

OTHER PUBLICATIONS

Office Action dated Jul. 26, 2016 in U.S. Appl. No. 14/049,783, and related attachments.
Office Action dated Feb. 9, 2007 in U.S. Appl. No. 09/989,909, and related attachments.
Office Action dated Dec. 9, 2010 in U.S. Appl. No. 11/635,804, and related attachments.
Office Action dated Oct. 8, 2010 in U.S. Appl. No. 12/537,205, and related attachments.
Office Action dated Sep. 7, 2012 in U.S. Appl. No. 13/237,770, and related attachments.
Office Action dated Mar. 6, 2012 in U.S. Appl. No. 11/635,804, and related attachments.
Office Action dated Apr. 6, 2009 in U.S. Appl. No. 11/302,303, and related attachments.
Office Action dated Sep. 5, 2008 in U.S. Appl. No. 11/200,599, and related attachments.
Office Action dated Aug. 5, 2013 in U.S. Appl. No. 11/635,804, and related attachments.
Office Action dated Oct. 4, 2012 in U.S. Appl. No. 12/628,930, and related attachments.
Office Action dated Nov. 4, 2013 in U.S. Appl. No. 11/635,804, and related attachments.
Office Action dated Jun. 3, 2005 in U.S. Appl. No. 09/989,909, and related attachments.
Office Action dated Apr. 3, 2007 in U.S. Appl. No. 09/989,985, and related attachments.
Office Action dated Jul. 29, 2004 in U.S. Appl. No. 09/989,909, and related attachments.
Office Action dated Feb. 28, 2017 in U.S. Appl. No. 14/321,587, and related attachments.
Office Action dated Jul. 27, 2012 in U.S. Appl. No. 12/628,930, and related attachments.
Office Action dated Jul. 27, 2009 in U.S. Appl. No. 11/635,804, and related attachments.
Office Action dated Oct. 26, 2012 in U.S. Appl. No. 11/635,804, and related attachments.
Office Action dated Jul. 26, 2006 in U.S. Appl. No. 09/989,909, and related attachments.
Office Action dated Jan. 26, 2017 in U.S. Appl. No. 14/828,199, and related attachments.
Office Action dated Feb. 26, 2016 in U.S. Appl. No. 14/049,783, and related attachments.
Office Action dated May 25, 2017 in U.S. Appl. No. 14/828,199, and related attachments.
Office Action dated Jul. 25, 2017 in U.S. Appl. No. 14/828,199, and related attachments.
Office Action dated Sep. 24, 2004 in U.S. Appl. No. 09/885,977, and related attachments.
Office Action dated Aug. 24, 2005 in U.S. Appl. No. 09/989,909, and related attachments.
Office Action dated Mar. 23, 2012 in U.S. Appl. No. 13/237,770, and related attachments.
Office Action dated Sep. 22, 2016 in U.S. Appl. No. 14/467,875, and related attachments.
Office Action dated Mar. 21, 2008 in U.S. Appl. No. 11/302,303, and related attachments.
Office Action dated Jul. 21, 2011 in U.S. Appl. No. 11/635,804, and related attachments.
Office Action dated Oct. 20, 2005 in U.S. Appl. No. 09/989,909, and related attachments.
Office Action dated Jan. 2, 2015 in U.S. Appl. No. 13/769,192, and related attachments.
Office Action dated Aug. 2, 2016 in U.S. Appl. No. 14/828,199, and related attachments.
Office Action dated Apr. 2, 2010 in U.S. Appl. No. 11/635,804, and related attachments.
Office Action dated Oct. 19, 2017 in U.S. Appl. No. 14/828,329, and related attachments.
Office Action dated Oct. 19, 2017 in U.S. Appl. No. 14/828,294, and related attachments.
Office Action dated Nov. 19, 2013 in U.S. Appl. No. 12/628,930, and related attachments.
Office Action dated May 19, 2017 in U.S. Appl. No. 14/049,783, and related attachments.
Office Action dated Feb. 18, 2005 in U.S. Appl. No. 09/989,909, and related attachments.
Office Action dated May 17, 2013 in U.S. Appl. No. 11/635,804, and related attachments.
Office Action dated Jun. 17, 2004 in U.S. Appl. No. 09/885,964, and related attachments.
Office Action dated Apr. 17, 2017 in U.S. Appl. No. 14/467,875, and related attachments.
Office Action dated Apr. 17, 2013 in U.S. Appl. No. 12/628,930, and related attachments.
Office Action dated Dec. 16, 2005 in U.S. Appl. No. 09/989,985, and related attachments.
Office Action dated Jan. 15, 2016 in U.S. Appl. No. 14/049,783, and related attachments.
Office Action dated Jun. 12, 2006 in U.S. Appl. No. 09/989,985, and related attachments.
Office Action dated Feb. 12, 2016 in U.S. Appl. No. 14/828,199, and related attachments.
Office Action dated Aug. 12, 2013 in U.S. Appl. No. 12/628,930, and related attachments.
Office Action dated Oct. 11, 2016 in U.S. Appl. No. 14/049,783, and related attachments.
Office Action dated Mar. 11, 2016 in U.S. Appl. No. 14/049,783, and related attachments.
Office Action dated Sep. 10, 2010 in U.S. Appl. No. 11/635,804, and related attachments.
Office Action dated Dec. 1, 2006 in U.S. Appl. No. 09/989,985, and related attachments.
Notice of Allowance dated May 9, 2005 in U.S. Appl. No. 09/885,977, and related attachments.
Notice of Allowance dated Dec. 7, 2004 in U.S. Appl. No. 09/885,964, and related attachments.
Notice of Allowance dated Jul. 6, 2017 in U.S. Appl. No. 14/321,587, and related attachments.
Notice of Allowance dated May 4, 2009 in U.S. Appl. No. 11/200,599, and related attachments.
Notice of Allowance dated Jul. 20, 2009 in U.S. Appl. No. 11/032,303, and related attachments.
Notice of Allowance dated Oct. 17, 2012 in U.S. Appl. No. 13/237,770, and related attachments.
Notice of Allowance dated May 16, 2011 in U.S. Appl. No. 12/537,205, and related attachments.

(56) References Cited

OTHER PUBLICATIONS

Notice of Allowance dated Apr. 16, 2015 in U.S. Appl. No. 13/769,192, and related attachments.
Notice of Allowance dated Jul. 14, 2017 in U.S. Appl. No. 14/828,199, and related attachments.
Notice of Allowance dated Feb. 14, 2014 in U.S. Appl. No. 12/628,930, and related attachments.
International Search Report PCT Patent Application No. PCT/US01/43961, dated May 20, 2002, 1 page.
International Search Report PCT Patent Application No. PCT/US01/43907, dated Jun. 14, 2002, 4 pages.
International Search Report for PCT Patent Application No. PCT/US02/11716, dated Aug. 21, 2002, 1 page.
International Search Report for PCT Patent Application No. PCT/US02/08111, dated Aug. 6, 2002, 1 page.
International Preliminary Examination Report dated Jul. 6, 2001 in PCT Application No. PCT/JP00/07253.
International Preliminary Examination Report dated Nov. 22, 2002 in PCT Application No. PCT/US01/43961.
International Preliminary Examination Report dated Nov. 12, 2002 in PCT Application No. PCT/US01/43907.
Decision on Petition dated Apr. 28, 2014 in U.S. Appl. No. 13/769,192.

\* cited by examiner

METHOD AND SYSTEM FOR PROVIDING INTERACTIVE SERVICES OVER A WIRELESS COMMUNICATIONS NETWORK

RELATED APPLICATIONS

This is a continuation application of U.S. patent application Ser. No. 11/635,804, entitled "METHOD AND SYSTEM FOR PROVIDING INTERACTIVE SERVICES OVER A WIRELESS COMMUNICATIONS NETWORK", by S. Douglas Hutcheson, filed Dec. 7, 2006, now allowed, which is a continuation application of U.S. patent application Ser. No. 09/989,985, entitled "METHOD AND SYSTEM FOR PROVIDING INTERACTIVE SERVICES OVER A WIRELESS COMMUNICATIONS NETWORK", by S. Douglas Hutcheson, et al., filed Nov. 21, 2001, now abandoned, which claims priority to and the benefit of U.S. Provisional Patent Application No. 60/252,468, entitled "METHOD AND SYSTEM FOR PROVIDING INTERACTIVE SERVICES OVER A WIRELESS COMMUNICATIONS NETWORK", by S. Douglas Hutcheson, et al., filed Nov. 22, 2000, the benefit of and priority to all aforementioned applications are claimed thereof and the entire contents of which are incorporated herein by reference.

FIELD OF THE INVENTION

The present invention generally relates to a method and system for providing interactive services via a communications network, and in particular to using telecommunications network resources and wireless, interactive application protocols.

BACKGROUND OF THE INVENTION

The interactive entertainment market is a fast growing segment of the entertainment industry. By 1998, the market had experienced its third straight year of double digit growth. In 1998 alone, video game sales exceeded $3.7 billion and computer games sales exceeded $1.8 billion. In 1998 alone, about 181 million units of PC and video games were sold in the United States.

From the early 1960's, interactive entertainment services ranged from mainframe, to video, and PC-based platforms. Sony, Nintendo and Sega, among others, have introduced interactive entertainment systems.

In 1989, Nintendo launched its popular Game Boy series of handheld interactive game devices. Nintendo released their Color Game Boy device in 1999. Although Nintendo's Game Boy series has not generally employed the most advanced technology available, it has adapted the available technology to meet the specific demands of the gaming market. For example, rather than using the higher resolution display devices available, Nintendo has adopted lower resolution screens, providing greatly extended battery life. It is believed that by June 2000, Nintendo had sold over 100,000,000 Game Boy units.

Due to its improved graphics quality and quality of the playing experience, implementing graphics quality comparable to the Nintendo Game Boy Advance system would impose even greater network bandwidth and resource demands than those associated with Gameboy, if deployed over a wireless network of the type and in a manner conventionally known.

BRIEF SUMMARY OF THE INVENTION

A system for providing one or more interactive applications to one or more users via a wireless communications network, the system including: one or more servers cooperating with the network to substantially deliver one or more interactive applications to one or more wireless access devices each corresponding to at least one of the users; wherein, after the one or more wireless access devices receive the substantially delivered one or more applications, upon request of one of the users the one or more corresponding wireless access devices receives communication from the server to facilitate the one of the users accessing the one or more interactive applications using the corresponding wireless access device.

BRIEF DESCRIPTION OF THE DRAWINGS

The present invention will now be described in connection with the following figures in which like reference numbers refer to like elements and wherein.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements found in a typical telecommunications system and method. Those of ordinary skill in the art will recognize that other elements are desirable and/or required in order to implement the present invention. However, because such elements are well known in the art, and because they do not facilitate a better understanding of the present invention, a discussion of such elements is not provided herein.

The present invention addresses delivering a rich, interactive, game experience over a network, such as a wireless network (CDMA type, for example), efficiently and cost effectively. In particular, the present invention offers an interactive experience, in which the action occurs in real time. The present invention features enhanced, state-of-the-art graphics. Moreover, by managing network traffic efficiently and effectively, the present invention conserves network capacity and offers the network operator and user cost savings advantages. This opens the possibilities to provide a wireless game service to end users at a flat monthly rate rather than a per unit of time consumed basis. In this regard the pricing model of Assignee's Cricket wireless telecommunications services may be adopted.

As embodied herein, the present innovation provides a means for distributing interactive services, such as multi player games, using a wireless network (CDMA type, for example). According to an aspect of the present invention, a wireless network and method of communicating between the gaming device and the wireless network that distributes information in a manner that provides the user a smooth and robust experience may be provided.

According to an aspect of the present invention, a system may include: a wireless network, one or more servers, and one or more handheld devices. The wireless network of the present invention may be data capable, as opposed to a first generation cellular (voice only) network. The network may be based upon PCS, TDMA, CDMA, or other suitable data capable technology(ies) or standard(s). A server of the present invention may include: software and means to maintain the interactive applications in synchronization with the network. The wireless handheld device(s) of the present invention may include: applications software; and sufficient memory to accomplish the purpose of the invention to offer improved efficiency of communication with the wireless network. The handheld device may take the form of a phone, a portable gaming device, or another appropriate device. In one respect, the present invention differs from prior known systems and devices in that significant software resources may be loaded and stored on the handheld device, rather than having to be delivered over the wireless network to the handheld device, upon demand, for example.

In addition, according to an aspect of the present invention, various options and enhancements that add to the users' enjoyment may be included, such as chat, Internet browsing, instant messaging, e-commerce and m-commerce services, and other interactive entertainment and/or communication services.

In addition to the software and clock functions, the server may provide: compression algorithms; prioritization algorithms; and Internet and intranet access capability. Similarly, the handheld device of the present invention may include: enhanced graphics; enhanced clock speed; improved refresh rate (similar to that of a GameBoy, for example); a handheld device that is ergonomically suited for gaining; color graphics; high resolution; long battery life; an enhanced processor; expanded memory (16 Mb, for example); be expandable (using expansion slots, for example); enhanced features, such as tremble; speakers; microphone; camera; a web browser; text entry system; chat; simultaneous voice; and be modular or integrated, for example.

The present invention provides a robust, high resolution, interactive, wireless system and method, that uses network resources more efficiently than prior known systems. It is therefore desirable to develop an efficient, high quality, interactive gaming system that overcomes the disadvantages and limitations of prior known systems and devices.

According to an aspect of the present invention, market penetration of interactive wireless services may be achieved and improved. According to an aspect of the present invention, the cost to the system operator of wireless game service may be reduced.

According to an aspect of the present invention, a degree to which interactive wireless services are network dependent may be reduced. According to an aspect of the present invention, a degree to which interactive wireless services are time of day dependent may be reduced. According to an aspect of the present invention, an availability of interactive wireless services may be increased.

According to an aspect of the present invention, network capacity may be efficiently utilized. According to an aspect of the present invention, network capacity may be efficiently utilized for interactive wireless gaming applications. According to an aspect of the present invention, an interactive application may be adjusted to substantially match applicable data transfer requirements of the wireless network. According to an aspect of the present invention, a substantial as amount of the software required to operate the interactive application may be maintained on a personal handset device as opposed to the network. According to an aspect of the present invention, a substantial amount of the instructions required to operate the interactive application may be maintained on a personal handset device as opposed to the network, in order to reduce network traffic.

According to an aspect of the present invention, wireless transmissions between the network and the personal device may be adapted to reduce latency. According to an aspect of the present invention, a latency of the response of the interactive application may be limited. According to an aspect of the present invention, a reduced cost interactive service may be achieved. According to an aspect of the present invention, a perceived speed of interactive use may be increased. According to an aspect of the present invention, differences in latency between users of the interactive service may be reduced and a substantially consistent level of latency between users of the interactive service may be achieved. According to an aspect of the present invention, a substantially even playing field for the interactive services may be provided. According to an aspect of the present invention, differentials that may exist between users of the interactive service based upon differences in download or modem speed between the portable handheld devices may be at least partially mitigated. According to an aspect of the present invention, a cost effective way to deliver interactive services to end users may be provided. According to an aspect of the present invention, an interactive gaming community may be supported. According to an aspect of the present invention, a system may provide one or more wireless interactive applications to one or more users.

According to an aspect of the present invention, a system may include: a wireless communication network; one or more servers, cooperating with the network to deliver one or more interactive application(s) to the one or more users; and one or more wireless access devices in communication with said network. The one or more wireless access devices may receive communication from the server to facilitate the users accessing the one or more wireless interactive applications on the wireless access device.

According to an aspect of the present invention, the system may include: a wireless communication network; an interactive application delivered over the wireless network to one or more users; one or more wireless access devices adapted to receive and render the interactive application to the user; control means for controlling the state of the interactive application; and network mediation means for controlling delivery of the interactive application to the one or more users.

According to an aspect of the present invention, the system may include: a wireless communication network adapted for transmission of communications to facilitate the one or more interactive applications at less than the full frame rate of voice communications; and one or more servers, cooperating with the network to deliver one or more interactive application(s) to the one or more users. The system may also include one or more wireless access devices, in communication with the network. The one or more wireless access devices may receive communications from the server to facilitate the users accessing the one or more wireless interactive applications on the wireless access device. The one or more interactive applications may further comprise high resolution game applications featuring substantially high resolution graphics, and may reside on the wireless access device.

According to an aspect of the present invention, and as is illustrated in the accompanying diagrams and disclosed in the accompanying claims, a system may be used for providing one or more wireless interactive applications to one or more users. The system may include: a wireless communication network; one or more servers operating with the network to deliver one or more interactive application(s) to the one or more users; and one or more wireless access devices, in communication with the network. The one or more wireless access devices receive communication from the server to facilitate users accessing the one or more wireless interactive applications.

According to an aspect of the present invention, a system may be used for providing one or more wireless interactive applications to one or more users. The system may include a wireless communication network adapted for transmission of communications to facilitating the one or more interactive applications at less than the full frame rate of voice communications, and one or more servers, cooperating with the network to deliver one or more interactive application(s) to the one or more users. The system may also include one or more wireless access devices, in communication with the network. The one or more wireless access devices may receive communications from the server to facilitate users accessing the one or more wireless interactive applications. The one or more interactive applications may further include high resolution game applications featuring high resolution graphics, and may reside on the wireless access device.

According to an aspect of the present invention, a method for providing one or more interactive applications to one or more users of a wireless communication network may be used. According to an aspect of the present invention, initiating a request for wireless interactive services to the network, sending communications to the network to request the interactive application, compiling the request and communicating to a wireless access device software necessary to perform the one or more interactive application, and initiating the interactive application may be performed. A method may further include communicating to the network one or more degrees of freedom of the interactive application, storing information about changes in state of one or more of the degrees of freedom caching the information, communicating the cached information to the server in order to efficiently utilize network resources (said wireless access device communicating signals reflecting the change of state of the interactive application), maintaining one or more interactive applications on the server, synchronizing the interactive applications among the users, and communicating updates to the one or more interactive applications until play is concluded or terminated.

It will be apparent to persons of ordinary skill in the art that modification and variations may be made in the present invention. For example, one or more interactive applications according to the present invention may include a latency of less than about 30 s, less than about 10 s, less than about 1 s, less than about 500 ms, less than about 300 ms, and/or less than about 200 ms. One or more interactive applications according to the present invention may also include high resolution graphics.

Furthermore, the wireless access device according to the present invention may include a handheld device. The wireless access device may further include an 8 bit microprocessor having a clock speed of greater than about 4 MHz. The wireless access device may further include: greater than about 256 kbit memory, greater than about 512 kbit memory, greater than about 1 Mbit memory, greater than about 2 Mbit memory, greater than about 4 Mbit memory, and/or greater than about 8 Mbit memory.

The wireless access device according to the present invention may further include a video display in excess of 160×144 pixels and may include a color display. The color display may be capable of rendering more than about 256 colors, 2,000 colors, 24,000 colors, 32,000 colors, or 64,000 colors. The wireless access device may include battery power source sufficient to power the device for more than about 30 hours. In addition, the wireless access device may include a 16 bit microprocessor, a 32 bit microprocessor, and/or a 32 bit RISC microprocessor. The microprocessor may have a clock speed of greater than about 8 MHz, and may have a clock speed of greater than 16 Mhz. The memory of the microprocessor may be external to the microprocessor. In addition, the wireless access device may include VRAM and/or WRAM memory. The wireless access device according to the present invention may further include a video display in excess of 240×160 pixels.

Users of a system according to the present invention may include up to eight or more simultaneous users. In addition, a system according to the present invention may conserve network resources relative to voice traffic. Communication from the network to the wireless access device may occur at a full frame rate. Moreover, communications from the network to the wireless access device may occur at a half frame rate.

Furthermore, a wireless access device according to the present invention may cache information regarding the interactive application and dispatch the communications to ensure efficient use of the network. In addition, an application feature according to the present invention may offer a user more than three degrees of freedom. An application feature may reside on the wireless access device.

It is intended that the present invention include the variations and modification that may be used in conjunction with them, provided they come within the scope of the appended claims and their equivalents.

It is to be understood that both the foregoing general description and the following detailed description are exemplary and explanatory only, and are not restrictive of the invention as claimed. The accompanying drawings, which are incorporated herein by reference, and constitute a part of the specification, illustrate certain embodiments of the invention, and together with the detailed description, serve to explain the principles of the present invention.

Figure 1:
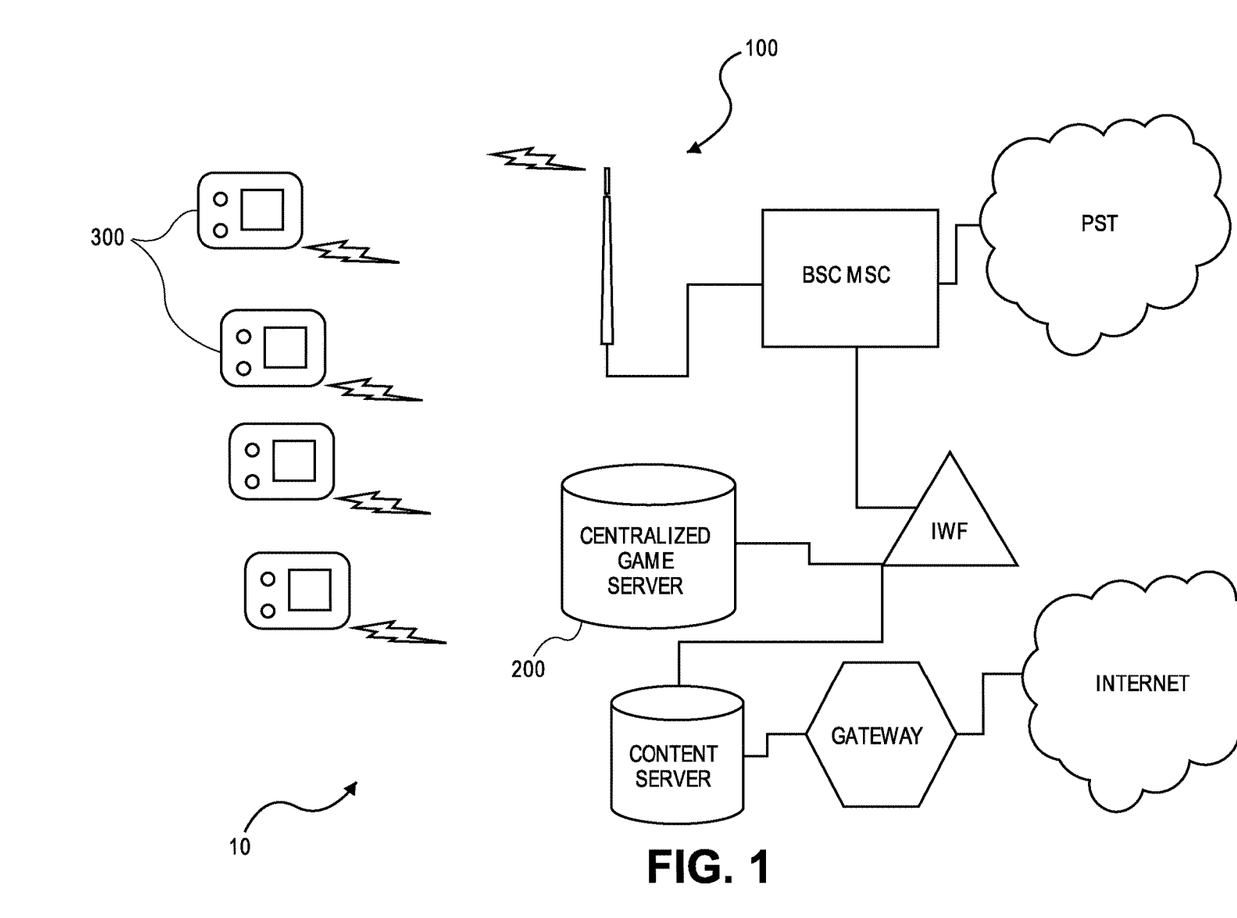
FIG. 1 is a diagram of the relationship of the elements of the invention in one embodiment of the present invention.

Reference will now be made in detail to a preferred embodiment of the method and system of the present invention, an example of which is illustrated in the accompanying drawings. A preferred embodiment of the present invention is shown in FIG. 1 as system 10.

System 10 may include: wireless network 100, a centralized game server 200, and wireless access device 300. Wireless network 100 may further include any suitable, data-capable wireless communications network. This includes, without limitation, any networks of the type known prior to the present invention, whether based upon PCS, TDMA, CDMA, or other technology, provided that technology provides a data enabled wireless network. The wireless network 100 of the present invention may be any advanced or improved data-capable network, such as 2.5G or 3G networks, as well as any further improvements in network technology. The present inventors consider any wireless network to be appropriate for use with the present invention, provided it is not a pure cellular network that lacks the capacity to transfer data.

Server 200 of the system 10 may include: software (not shown), and synchronization means (not shown). Synchronization means may include a clock.

Wireless access device 300 may include any suitable means for providing access to an interactive application over a wireless communications network. For example, a wireless access device may be a Game Boy or comparable device, a wireless phone, or any other device through which the user can interface with the interactive application over the wireless network. Wireless access device 300 may further include: software (not shown), and memory (not shown).

According to an aspect of the present invention, one or more users may access interactive applications (not shown) through the wireless access device 300. A user may activate the wireless access device 300 by initiating a communication with the wireless network 100. The user may select an application, causing server 200 to deliver the appropriate software to wireless access device 300 through a wireless communication over network 100. As embodied herein, the interactive application may provide a high quality interactive experience, at a degree of interactivity and graphic resolution comparable to or greater than that provided by a Game Boy gaming device, for example. The interactive application may reside substantially in the handheld device 300 rather than server 200 or other wireless network 100 component. This enables the system to reduce the amount of wireless communication traffic necessary to facilitate the interactive service.

According to an aspect of the present invention, an interactive application may be delivered that features updates at a rate of at least once per second, and preferably more frequently than about three times per second. The graphic resolution of the wireless access device may be better than about 160×140 pixels, and preferably better than about 240×160 pixels. In addition the present invention may offer a substantially real-time, interactive experience.

According to an aspect of the present invention, the system 10 may includes: a CDMA wireless communications network 100, server 200 adapted for coordination of the interactive applications, and wireless access device 300, adapted for high resolution, real time, interactive applications.

It will be apparent to persons of ordinary skill in the art that various modifications may be made to the present invention without departing from the scope or spirit of the invention. For example, the wireless network 100 may employ any wireless network having data capability. Server 200 of the present invention may also include compression algorithms for reducing the size of the wireless communications required to facilitate the application; prioritization algorithms to speed certain communications; and Internet and Intranet access capability. The server 200 may be built on any suitable, conventional technology. Handheld device 300 of the present invention may include any of an number of enhancements including, without limitation: enhanced graphics; variable or enhanced clock speed; variable or enhanced refresh rate; ergonomic design, particularly adapted for gaming; color; enhanced resolution; long battery life; enhanced processor capability; enhanced memory (16M or greater); expandable memory—whether based upon chips, cards, expansion slots or other suitable technology; tremble function; speakers; microphone; camera; video; Web Browser; text entry and editing system; chat; simultaneous voice; modular components (preferred) or integrated components (alternative). It is intended that the present invention include each of the above enhancements and modifications and variations, provided they come within the scope of the appended claims and their equivalents.

According to an aspect of the present invention, a method of using one embodiment of the system 10 of the present invention may include enabling the handheld device 300, and initiating a request for wireless interactive services to the network 100, whether initiated by the user, or in response to an anonymous challenge of specific request; sending data messages to network 100 to request game. In response, server 200 may compile the request and dispatch software necessary to run the interactive application. Server 200 may then initiate a game, sending a ready signal to each participant and play begins. Each client may move—having up to about 20 degrees of freedom in a preferred embodiment of the interactive application, for example. The handheld device 300 may store signals and cache instructions to the server 200 in order to utilize network resources more efficiently. Handheld devices 300 may send signals substantially only reflecting the change of state until frame is full (or ⅓ second goes by) whichever occurs first, for example. Server 200 may receive inputs, maintain state of game, and synchronize the clients (at a rate that ensures minimum latency, for example).

Server 200 may broadcast updates until the application is concluded or terminated.

The foregoing steps may be altered. In addition, the above description is merely illustrative of one preferred method of using the invention and is not intended to limit the invention as disclosed and claimed.

It will be apparent to persons of ordinary skill in the art that various modifications and variations may be made in the process of the present invention. For example, handheld device 300 may take the form of any appropriate wireless attachment or device. Interactive applications may be initiated either directly by the user, by a buddy, anonymously, or by the server. The system may be capable of building and retaining a profile of the user. The system may provide access to a gaming community. The user may be offered a choice of gaming options. The user may be allowed to download applications, particularly data intensive applications, overnight, when network capacity is higher. The system may be available in an always-on mode to provide instant messaging and other interactive services. The system may provide the user the option of initiating play based upon interactions with a text message, or player, or server. Scores may be posted. Awards, premiums, free play and other incentives may be offered. Tournaments may be held and prizes awarded. Thus, it is intended that the present invention include these variations and modifications, provided they come within the scope of the appended claims and their equivalents.

According to an aspect of the present invention, a choice of an appropriate wireless air interface (CDMA, for example) allows the operator to optimize a game service. It is believed that the use of a CDMA network, relative to other currently known and used technologies, provides a high quality game experience, with low and consistent latency, utilizing limited bandwidth, that is highly efficient, which leads to low cost to the service. Since the wireless airlink bandwidth resource is utilized by a variety of services, it is important to preserve as much capacity (bandwidth) as possible. This maintains the network in an efficient and cost effective manner.

Figure 2:
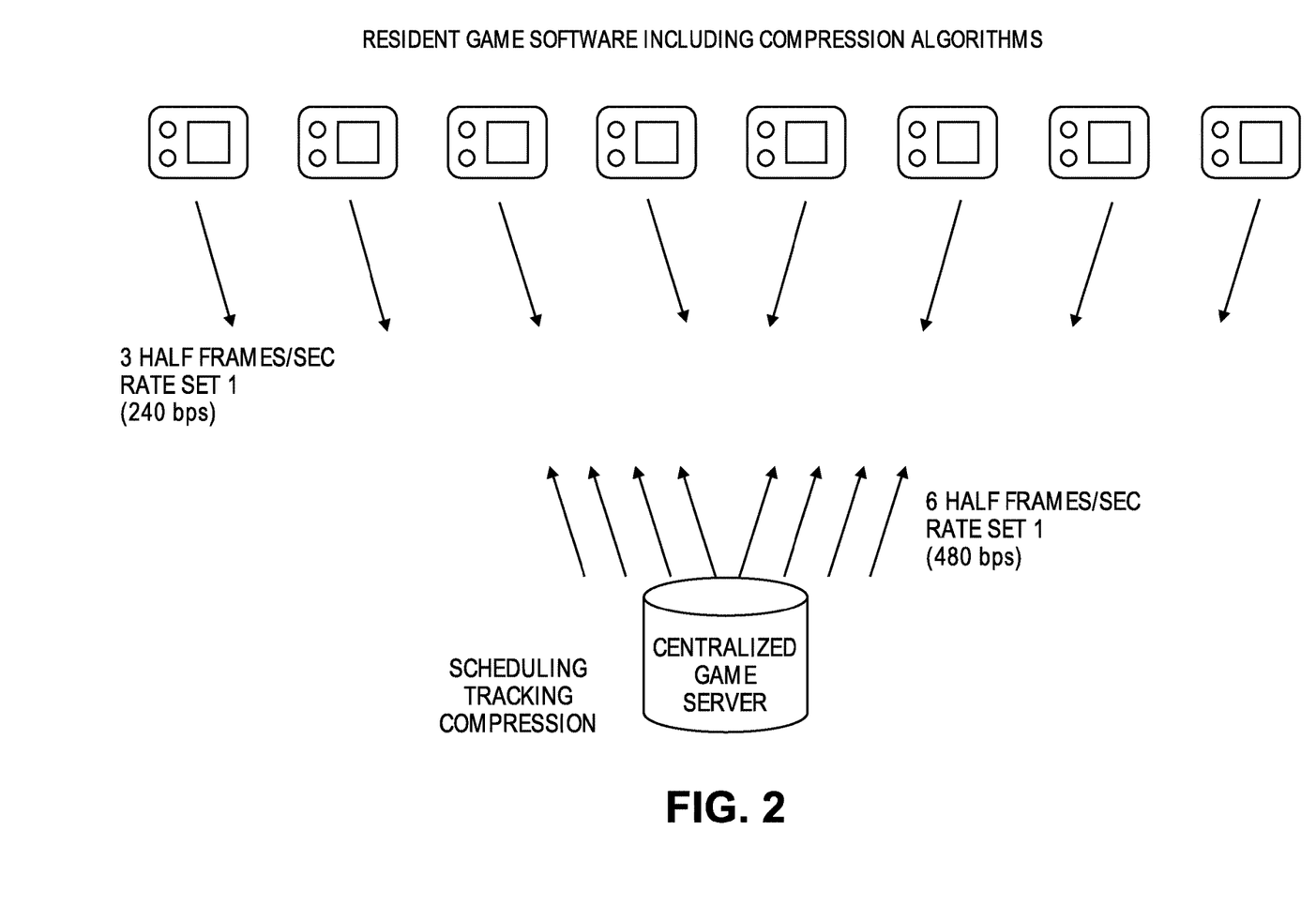
FIG. 2 is a diagram of the relationship of the data transfer rate between the handheld devices and network of the present invention.

According to an aspect of the present invention, in order to allow for a high quality service, the actual application software may be resident on the device, as shown in FIG. 2. This includes, but is not limited to, the graphics, instructions, transmission algorithms and compression algorithms. With this loaded (e.g., downloaded via the wireless network at low usage times, or distributed in form to be loaded onto the devices, or downloaded over any manner of data transmission) on the game device, interactive play may only require a relatively bare minimum of information to be transmitted to the other players (via the game server).

The minimum information that preferably is transmitted between the network 100 and the handheld device 300 may be limited to actions that can take place. These actions may be separated into degrees of freedom (i.e. move up/down, move left/right, fire weapon, for example). When one of these degrees of freedom changes, the server may need to be notified by the resident game. This may be done with a minimum amount of information. Since each degree of freedom may be limited to only two states only one bit may be required, for example. More bits may be used, to provide additional robustness, for example.

The wireless (CDMA) packet operation allows for a variety of rate sets. The interface may also allow for essentially two different frame sizes for each rate set (half rate frames and full rate frames). Other frames may not be considered relevant if they are used for null bits during times of no activity, however, they may be used if appropriate, for example. Thus, while persons of ordinary skill may consider them not to be useful, they may be used as part of the present invention, if appropriate. By correlating the number of degrees of freedom for game play (which may be less than about 20 for a typical application) with the required latency (preferably less than about 300 ms/round trip) and the maximum number of interactive players (preferably about 8), parameters for a service that is tailored to the wireless (CDMA) network using rate set 1, half rate frames may be determined. This may allow for 6 updates (one update per frame) per second from the game server to all the users, and 3 updates per second from the handheld game device, for example. This will allow the users to interact in a very near real-time feel, and keep latency levels near that of the wireless (CDMA) networks intrinsic latency of 300 ms. Configured in this manner, the frames may be of sufficient size to carry all the needed information for updates to and from the server.

Bandwidth usage may be a critical limiting parameter in current wireless communications networks. In order to conserve bandwidth, header compression may be used for the IP network and employed by the interactive game service. This can be accomplished using conventional technologies, such as TCP and/or UDP for example.

The game server 200 may keep track of inputs from each individual player and "broadcast" them to the users. Server 200 may synchronize each users' state. In a preferred embodiment of the present invention, server 200 may transmit substantially only updates based on actual change of state of a degree of freedom. Server 200 may schedule updates such that the minimum amount of latency may be achieved (e.g., send an update every 150 ms regardless of whether or not a state change of a player has been registered).

Based upon the configuration described above, the amount of bandwidth that may be dedicated to the interactive application can be determined. A CDMA network of the type deployed in Assignee's Cricket® branded service offerings in various markets in the United States may be used. Cricket® brand voice service may be based on about 5.2 kbps (13 k×40% utilization). It is estimated that the cost of Cricket® voice service may be substantially lower than industry average cost. Using the Cricket® network, therefore, may enable interactive services to be provided at reduced cost.

By way of example, according to an embodiment of the present invention as shown in FIG. 2, using Rate Set 1 and transferring data the full frame rate, the maximum transmission rate of 20 bytes of data required to accommodate 20 degrees of freedom would equate to 50 frames/sec. This equates to a data payload of 134 bits. At a half frame rate, 10 bytes of data would also equate to 50 frames/sec, at a data payload of only 67 bits. Some bits (e.g., 26 bits) may be allocated to overhead bits, leaving the balance that is available for data payload (108 and 41 bits, respectively).

Using Rate Set 2, and transferring data using a full frame rate, a maximum transmission rate of 33 bytes of data at 50 frames/sec. equates to a data payload of 238 bits. At a half frame rate, 17 bytes of data, at 50 frames/sec. equates to a data payload of 119 bits. Some bits (e.g., 26 bits) may again be allocated to overhead bits, leaving the balance available for data payload (212 and 93 bits, respectively). At 3 hours of play per day, under Rate Set 1: 4.5 full frames per second (9 half rate frames) could be transferred while staying within available bandwidth. Under Rate Set 2, 2.5 full frames per second (5 half rate frames) could be transferred while staying within bandwidth. Quarter and eighths rate frames, as well as other suitable frame rates could also be employed with the present invention.

According to an aspect of the present invention, the interactive application may offer a user twenty (20) degrees of freedom, and two (2) states per each degree of freedom. This application requires a maximum of 20 bits to update status within the game, even if all of the degrees of freedom change. On average, it is believed that only 8 degrees of freedom will typically change per second. In order to update the status of the play, therefore, the update will require each player to supply information about each degree of freedom plus address bits. For example, for an 8 player game, about up to about 170 bits would be required to update the status of play, provided all degrees of freedom change, for all players. Updates preferably would be provided at half the rate of the round trip delay, or 6 per second. Assuming 8 degrees of change per player, per second, to update 6 times per second requires only 15 bits per update, which easily fits into the half rate frame of Rate Set 1, as described above.

With respect to system architecture, according to an aspect of the present invention, substantially only change of state information needs be transmitted between the handheld device 300 and the network 100. The interactive game application software may be resident on the hand-held device, and not on the network 100 or server 200. Game downloads may occur during low utilization periods, such as at night for example. The user could request a download and it would be ready the next morning, for example, having occurred during the hours when network traffic is lightest and more bandwidth is available for low priority uses.

In addition, the method and system of the present invention may allow 6 updates from server per second to players. This enables the system to conserve bandwidth while also limiting latency. Using half rate frames also minimizes air link utilization, conserving bandwidth. This leaves 3 half rate frames per second for each player to upload their change of state. The system and method may use maximum available header compression to eliminate as many bits as possible. Various algorithms, of the type well known in the art, may be provided as part of the game software 400 that is downloaded, and resident on the device, and in the game server. According to an aspect of the present invention, game server 200 may track players simultaneously, but updates per the schedule (6 times per second). This can be adjusted downward for other types of games requiring less movement and action, for example.

It will be apparent to persons of ordinary skill in the art that modification and variations may be made in the present invention, and in particular in the process of data transfer between the network 100 and hand-held device 300. For example, various header compression protocols (such as TCP/IP, UDP, and others may be used). Other techniques, known in the art but that were not employed in wireless interactive applications may be used to conserve bandwidth. Other interfaces may be used, such as the interface or the IWF network interface, as shown in FIG. 1. In addition, the network server 200, could be connected to the L interface to save bandwidth. IP addressing may be maintained in a minimal fashion, as necessary to support the application. Additional steps may also be taken to ensure that IP packets translate into CMDA frames as required.

Figure 3:
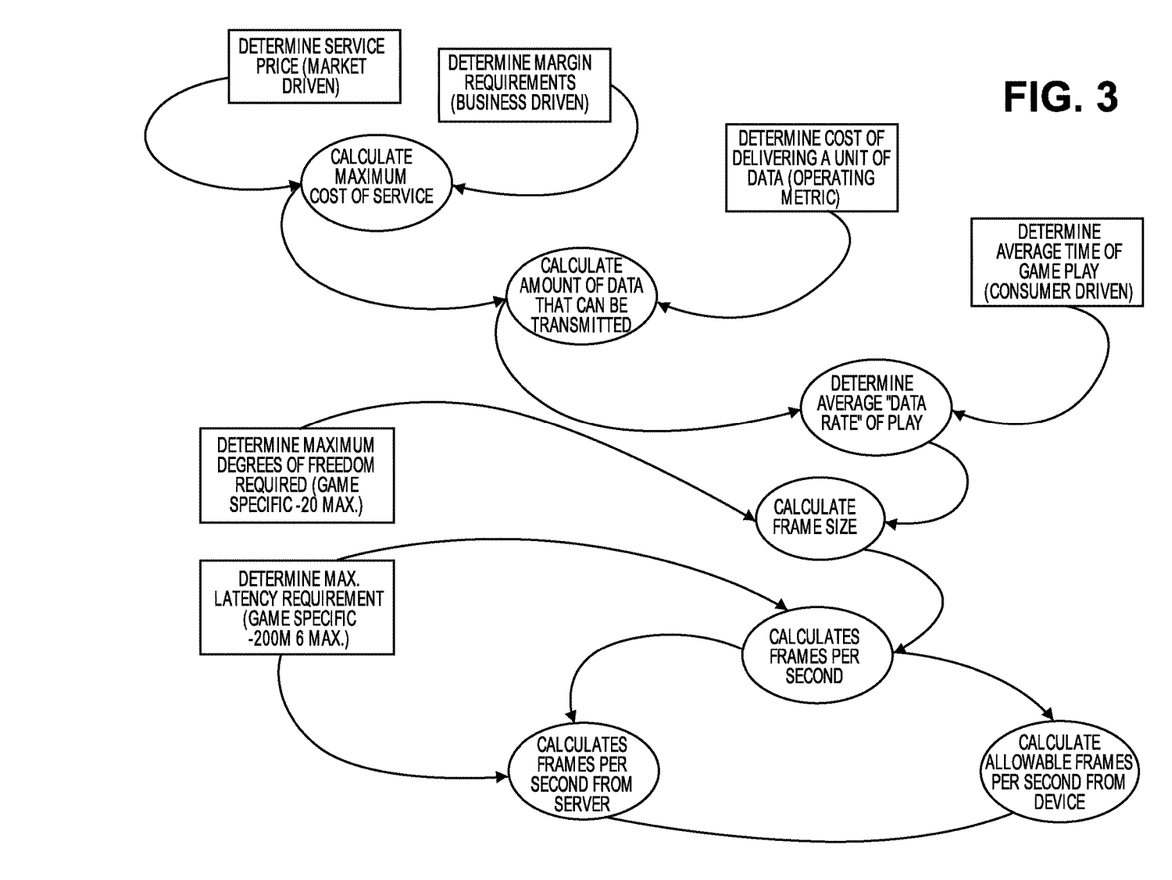
FIG. 3 is a flowchart depicting a method for providing one or more wireless interactive applications according to the present invention.
Figure 4:
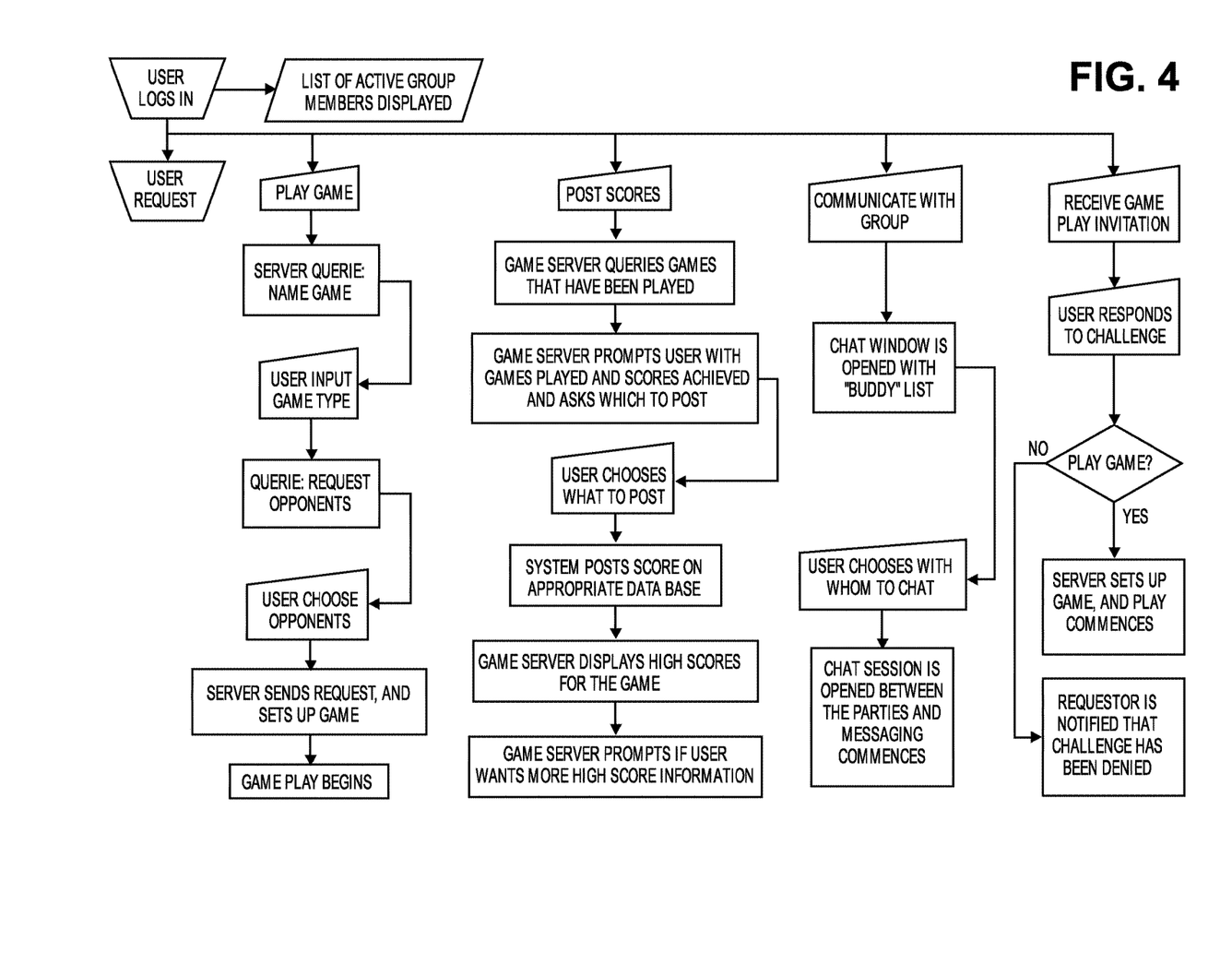
FIG. 4 is a flowchart depicting the steps in the overall method according to one embodiment of the present invention.

FIG. 3 illustrates the process of providing a system for providing one or more wireless interactive applications to one or more users according to an aspect of the present invention. Initially, the service price and margin requirements may be determined in order to calculate a maximum cost of service. Next, the amount of data that can be transmitted may be calculated based upon a determination of the cost of delivering a unit of data. The average "data rate" of play may be determined based upon the average time of game play. The system according to the present invention may further determines a maximum degrees of freedom required based on the specific game being played. This enables a calculation of an optimal frame size. Also based on the specific game being played, the maximum latency requirement may be determined. For fast-paced games, less latency may be tolerated. Conversely, for slow-paced games, more latency may be tolerated. This determination enables a calculation of the allowable frames per second delivered to and from the server 200.

Figure 5:
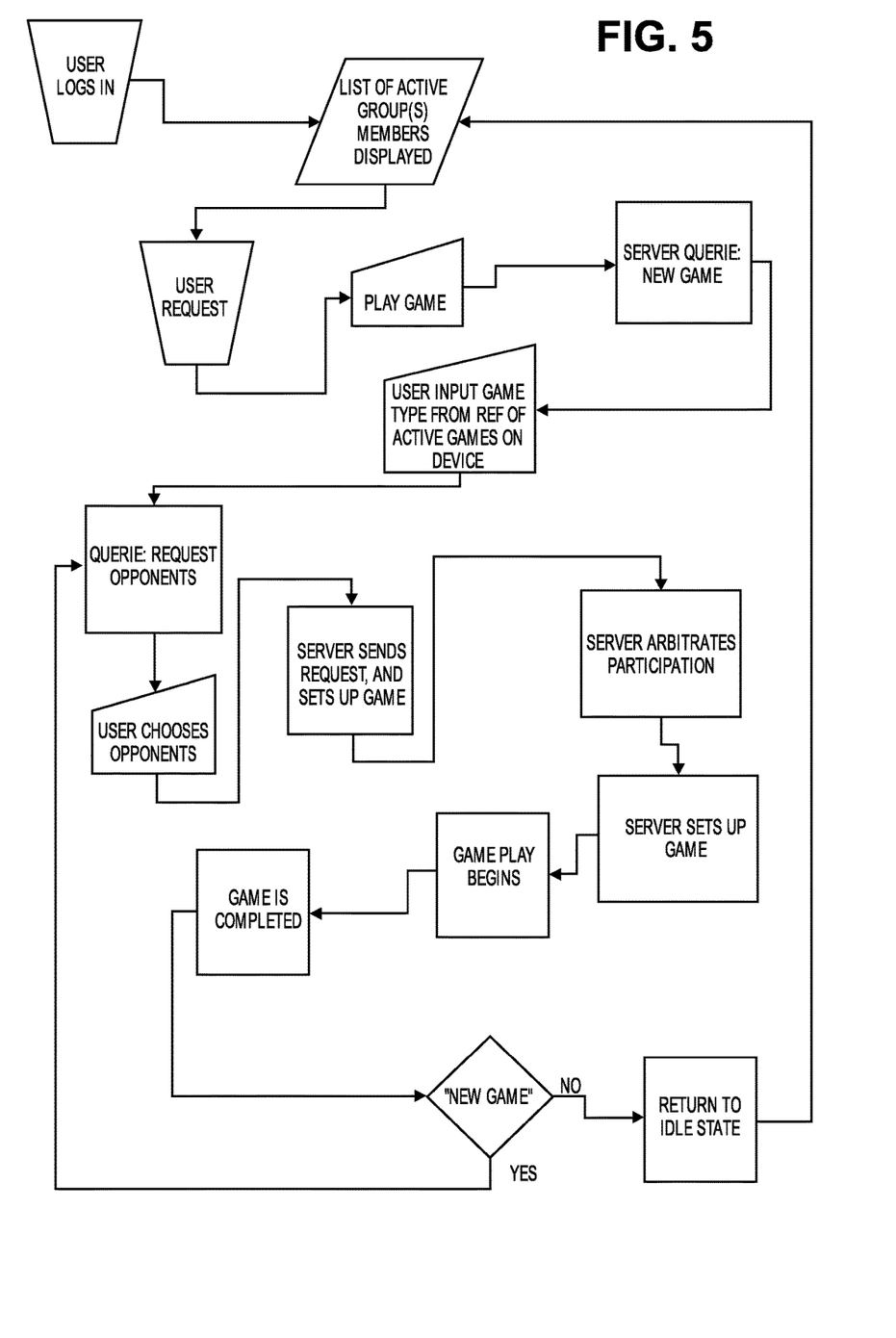
FIG. 5 is a flowchart depicting the steps of a user selecting to play a game according to one embodiment of the present invention.
Figure 6:
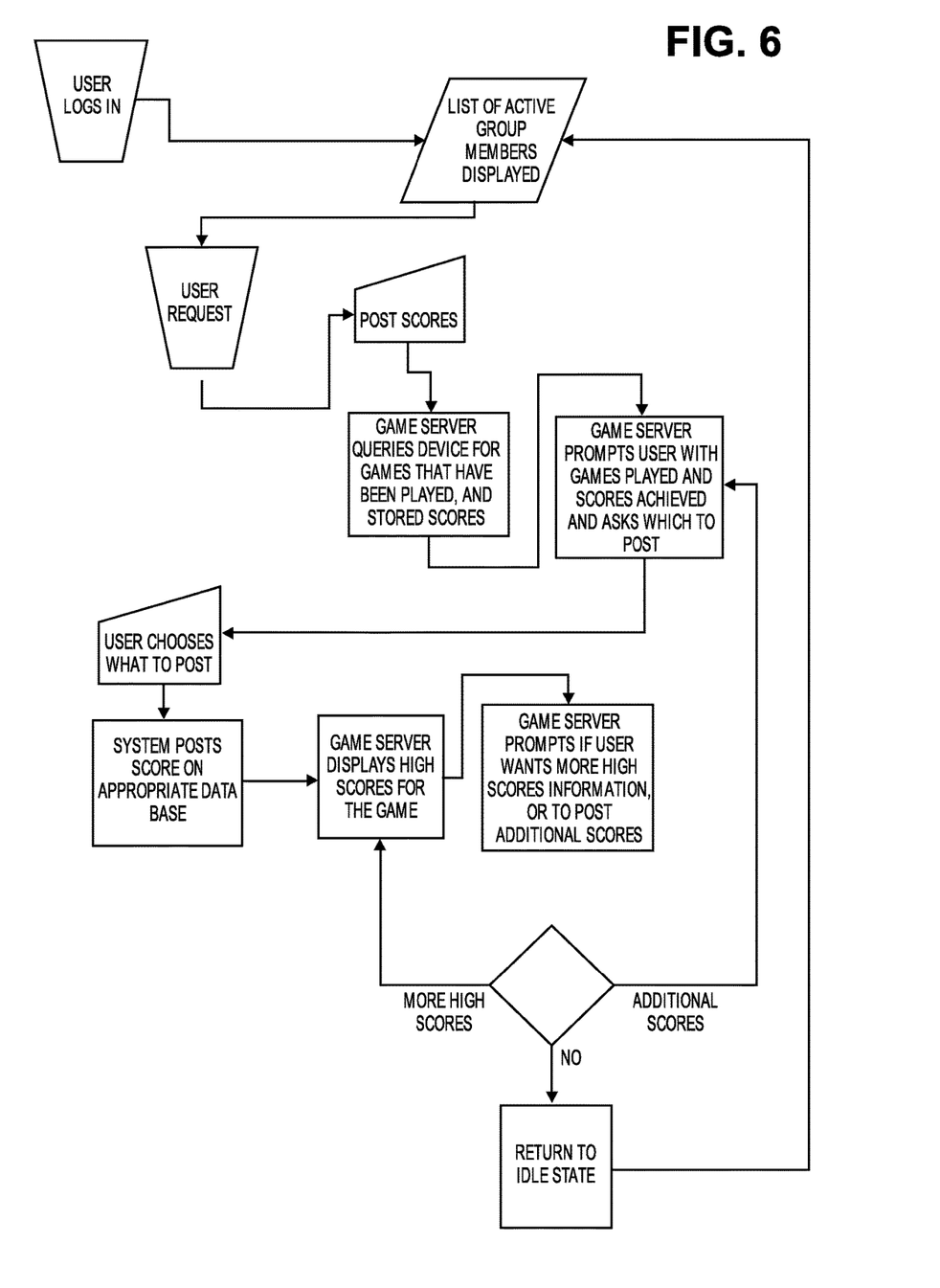
FIG. 6 is a flowchart depicting the steps of a user selecting to post scores according to one embodiment of the present invention.
Figure 7:
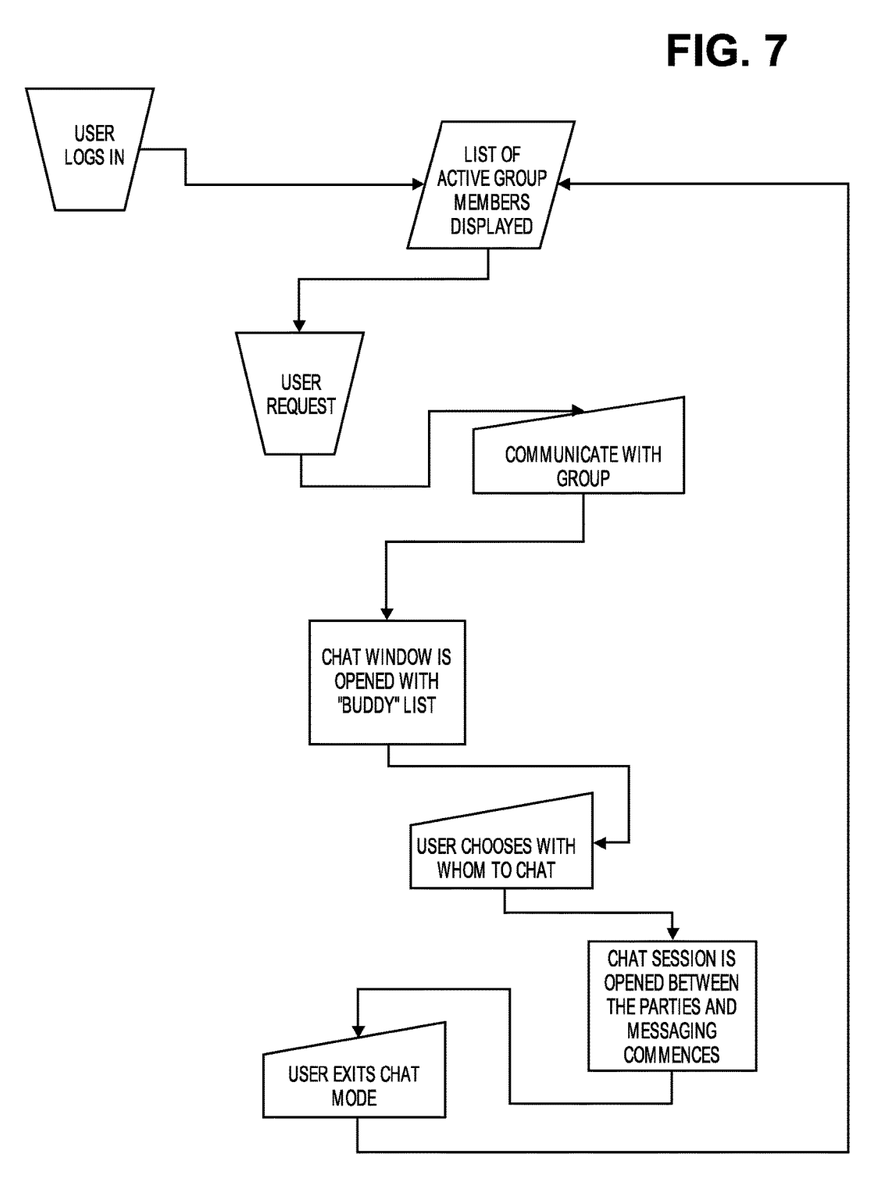
FIG. 7 is a flowchart depicting the steps of a user selecting to communicate with a group of users according to one embodiment of the present invention.
Figure 8:
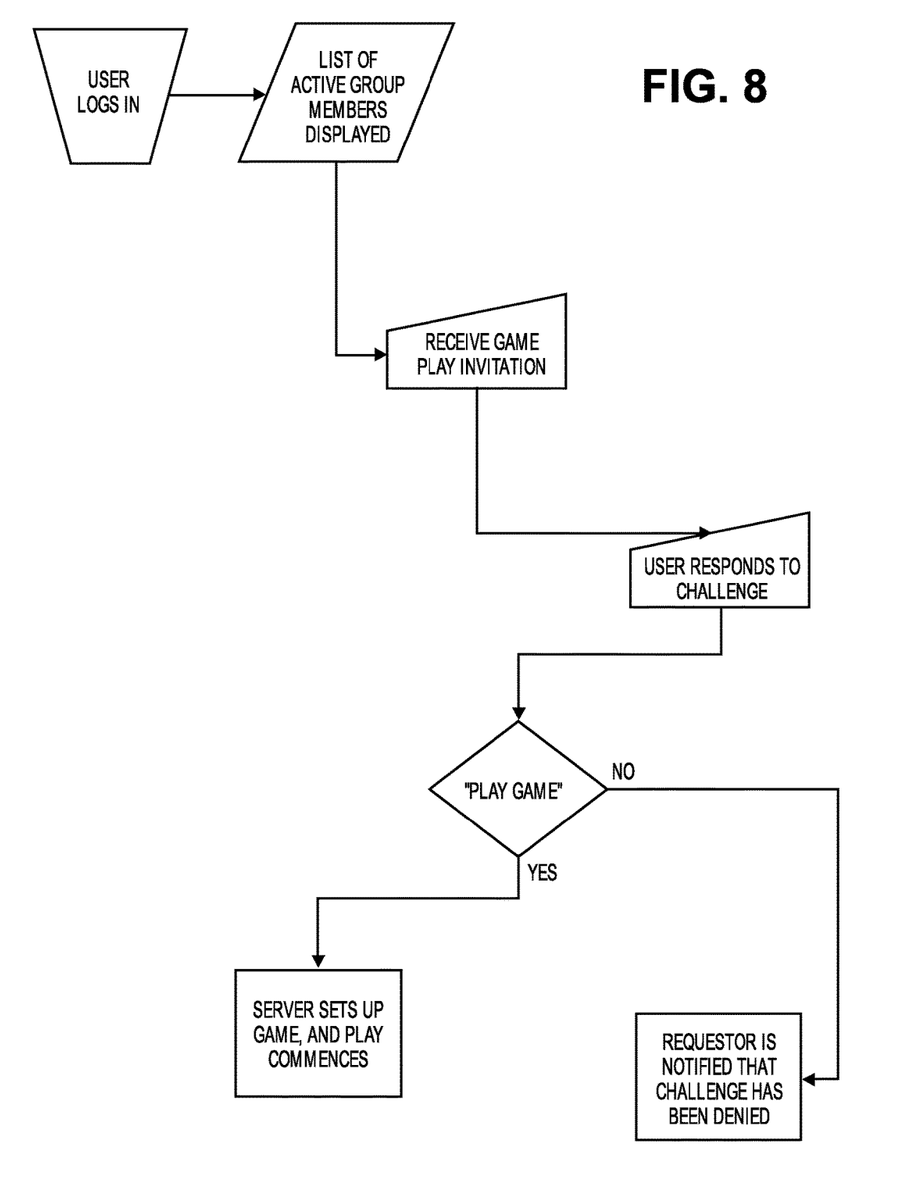
FIG. 8 is a flowchart depicting the steps of a user receiving an invitation to play a game according to one embodiment of the present invention.

FIGS. 4 through 8 illustrate flowcharts depicting various steps involved in the method according to several aspects of the present invention. FIG. 5 illustrates a flowchart depicting the steps of a user selecting to play a game. FIG. 6 illustrates a flowchart depicting the steps of a user selecting to post scores. FIG. 7 illustrates a flowchart depicting the steps of a user selecting to communicate with a group of users according to one embodiment of the present invention. FIG. 8 illustrates a flowchart depicting the steps of a user receiving an invitation to play a game according to one embodiment of the present invention.

The system and method of the present invention may be fully compatible and usable in conjunction with PC based games, as well as Internet applications, and TV-based games. In addition, service employing the system and method of the present invention may be offered as a flat rate offering in conjunction with services such as Assignee's Cricket<sup>SM</sup> wireless communications service. Such services may be offered on a prepaid billing service for game purchase. In addition, scores may be posted through the wireless network in a number of locations. Numerous other variations and modification will be apparent to persons of ordinary skill that will facilitate the delivery of wireless interactive applications, at high level of graphic quality, while more efficiently using network bandwidth and resources than prior known systems and methods. Thus, it is intended that the present invention include the variations and modification that may be used in conjunction with them, provided they come within the scope of the appended claims and their equivalents.

What is claimed is:

1. A system for providing an interactive application to one or more users via a wireless communications network, the system comprising:

a wireless access device coupled to a server cooperating with a wireless communication network, the wireless access device configured to receive an interactive application delivered from the server over the wireless communication network, the wireless access device corresponding to at least one user of a plurality of users interacting with the interactive application over the wireless communication network;

the wireless access device is further configured to execute the interactive application in response to a request received over the wireless communication network or a request by the user of the wireless access device, wherein the interactive application executing on the wireless access device stores state information into a cache on the wireless access device, the cached state information indicating changes in state of one or more degrees of freedom associated with the interactive application on the wireless access device, wherein each degree of freedom includes multiple states;

the wireless access device is further configured to communicate the cached state information from the wireless access device to the server;

the wireless access device is further configured to receive, responsive to a request of any one of plurality of users, a cached communication from the server to facilitate interacting with the interactive application, wherein the cached communication includes cached state information indicating changes in state of one or more degrees of freedom associated with the plurality of users interacting with the interactive application, wherein each degree of freedom includes multiple states, wherein a maximum of the one or more degrees of freedom is determined by the server based on the interactive application being a specific game to enable the server to dynamically calculate an optimal frame size, and wherein a maximum latency for a fast-paced interactive application or a slow-paced interactive application is determined by the server based on the specific game being played to enable the server to calculate an allowable frames per second to and from the server; and the wireless access device further configured to store, in a memory of the wireless access device, the cached state information received from the server.

2. The system of claim 1, wherein communicating changes in state of one or more degrees of freedom to the server is performed at a predetermined interval or in response to an actual change of state in the cached state information of the wireless access device.

3. The system of claim 1, wherein the wireless access device includes a handheld device.

4. The system of claim 1, wherein the wireless access device includes a microprocessor.

5. The system of claim 4, wherein the microprocessor utilizes a clock speed of greater than about 4 MHz.

6. The system of claim 1, wherein the wireless access device includes at least one memory.

7. The system of claim 1, wherein the wireless access device includes a color display.

8. The system of claim 1, wherein the wireless access device includes a battery power source.

9. The system of claim 1, wherein the plurality of users is interacting with the interactive application simultaneously.

10. The system of claim 1, wherein the plurality of users comprises three or more users.

11. The system of claim 1, wherein at least a portion of communications from the wireless access network to the wireless access device is at a full frame rate.

12. The system of claim 1, wherein the wireless access device is configured to receive at least a portion of the cached communication from the server at a half frame rate over the wireless access network.

13. The system of claim 1, wherein the interactive application offers each of the plurality of users at least three degrees of freedom.

14. The system of claim 1, wherein the wireless access device is further configured to store in memory the interactive application.

15. A method for performing an interactive application using a wireless access device over a wireless communication network, said method comprising:
   substantially receiving, by the wireless access device, from a server, over the wireless communication network, software necessary to perform the interactive application;
   executing the interactive application in response to a request received over the wireless communication network or a request by a user of the wireless access device;
   storing, into a cache of the wireless access device, state information of the interactive application executing on the wireless access device, the cached state information indicating changes in state of one or more degrees of freedom associated with the interactive application on the wireless access device, wherein each degree of freedom includes multiple states;
   communicating, by the wireless access device, changes in state of one or more degrees of freedom associated with the interactive application to at least one server; and,
   receiving, from the server, communications indicative of synchronization of the interactive application, including cached updates to at least one of the one or more degrees of freedom associated with the interactive application based on interaction by a plurality of users with the interactive application, including cached state information indicating changes in state of the one or more degrees of freedom, each degree of freedom having multiple states associated with the interactive application, the interactive application including a game wherein a maximum of the one or more degrees of freedom is determined by the server based on the interactive application being a specific game to enable the server to dynamically calculate an optimal frame size, and wherein a maximum latency for a fast-paced interactive application or a slow-paced interactive application is determined by the server based on the specific game being played to enable the server to calculate an allowable frames per second to and from the server.

16. The method of claim 15, wherein communicating changes in state of one or more degrees of freedom to the server is performed at a predetermined interval or in response to an actual change of state in the cached state information of the wireless access device.

17. The method of claim 15, wherein the wireless communication network device comprises a handheld device and the method further comprises substantially storing the software using the handheld device.

18. The method of claim 15, wherein the receiving communications is performed at a full frame rate.

19. The method of claim 15, wherein the receiving communications is performed at a half frame rate.

20. The method of claim 15, wherein the receiving communications is performed at less than a full frame rate.

21. The method of claim 15, wherein the interactive application offers users at least three degrees of freedom.

22. A computer program product embodied on a non-transitory computer-readable storage medium for performing an interactive application using a wireless access device over a wireless communication network, the computer program product comprising:
   code for substantially receiving, by the wireless access device, from a server, over a wireless communication network, software necessary to perform the interactive application;
   code for executing the interactive application in response to a request received over the wireless communication network or a request by a user of the wireless access device;
   code for storing, into a cache of the wireless access device, state information of the interactive application executing on the wireless access device, the cached state information indicating changes in state of one or more degrees of freedom associated with the interactive application on the wireless access device, wherein each degree of freedom includes multiple states;
   code for the wireless access device to communicate changes in state of one or more degrees of freedom associated with the interactive application to at least one server at a predetermined interval; and,
   code for receiving, from the server, communications indicative of synchronization of the interactive application, including cached updates to at least one of said the one or more degrees of freedom associated with the interactive application based on interaction by a plurality of users with the interactive application, wherein the cached updates include including cached state information indicating changes in state of the one or more degrees of freedom, each degree of freedom having multiple states associated with the interactive application, the interactive application including a game, wherein a maximum of the one or more degrees of freedom is determined by the server based on the interactive application being a specific game to enable the server to dynamically calculate an optimal frame size, and wherein a maximum latency for a fast-paced interactive application or a slow-paced interactive application is determined by the server based on the specific game being played to enable the server to calculate an allowable frames per second to and from the server.

* * * * *